(12) United States Patent
Szedo et al.

(10) Patent No.: US 9,013,611 B1
(45) Date of Patent: Apr. 21, 2015

(54) METHOD AND DEVICE FOR GENERATING A DIGITAL IMAGE BASED UPON A SELECTED SET OF CHROMINANCE GROUPS

(71) Applicant: Xilinx, Inc., San Jose, CA (US)

(72) Inventors: Gabor Szedo, Broomfield, CO (US); Steven P. Elzinga, Erie, CO (US); Jose R. Alvarez, Sunnyvale, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 14/020,108

(22) Filed: Sep. 6, 2013

(51) Int. Cl.
*H04N 9/64* (2006.01)
*H04N 9/04* (2006.01)
*G06K 9/32* (2006.01)
*H04N 9/73* (2006.01)
*G06T 3/40* (2006.01)

(52) U.S. Cl.
CPC ............... *H04N 9/045* (2013.01); *H04N 9/735* (2013.01); *H04N 2209/046* (2013.01); *G06T 3/4015* (2013.01)

(58) Field of Classification Search
CPC .............. H04N 2209/046; H04N 2201/04787; H04N 9/735; G06T 3/4015
USPC ........... 348/241, 242, 273, 272; 382/269, 300
See application file for complete search history.

(56) References Cited

U.S. PATENT DOCUMENTS

| | | | |
|---|---|---|---|
| 7,791,648 B2 * | 9/2010 | Guarnera et al. | 348/223.1 |
| 8,400,533 B1 | 3/2013 | Szedo et al. | |
| 2003/0052981 A1 * | 3/2003 | Kakarala et al. | 348/272 |
| 2004/0257467 A1 * | 12/2004 | Nicolas | 348/452 |
| 2005/0200733 A1 * | 9/2005 | Malvar | 348/272 |
| 2006/0087567 A1 * | 4/2006 | Guarnera et al. | 348/223.1 |
| 2008/0240559 A1 * | 10/2008 | Malvar | 382/167 |
| 2009/0027525 A1 * | 1/2009 | Lin et al. | 348/272 |
| 2009/0092338 A1 * | 4/2009 | Achong | 382/300 |
| 2009/0136127 A1 * | 5/2009 | Kwak et al. | 382/167 |
| 2010/0177961 A1 * | 7/2010 | Kalman | 382/167 |
| 2010/0182466 A1 * | 7/2010 | Chang et al. | 348/273 |
| 2011/0063480 A1 * | 3/2011 | Kim | 348/242 |
| 2011/0069192 A1 * | 3/2011 | Sasaki | 348/222.1 |
| 2011/0075948 A1 * | 3/2011 | Saito | 382/300 |
| 2011/0234823 A1 * | 9/2011 | Terasawa | 348/208.4 |

(Continued)

FOREIGN PATENT DOCUMENTS

WO    WO 2007075039 A1 *   7/2007

OTHER PUBLICATIONS

Nakamura, Junichi, *Image Sensors and Signal Processing for Digital Still Cameras*, Aug. 5, 2005, pp. 60-67, CRC Press, Boca Raton, FL, USA.

(Continued)

*Primary Examiner* — John Villecco

(74) *Attorney, Agent, or Firm* — John J. King

(57) ABSTRACT

A method of generating a digital image is described. The method comprises detecting light from a scene to form an image; identifying an aberration in the image; and implementing a color filter array interpolator based upon the detected aberration in the image. A device for generating a digital image is also described.

20 Claims, 8 Drawing Sheets

(56) References Cited

U.S. PATENT DOCUMENTS

| | | | |
|---|---|---|---|
| 2012/0013769 A1* | 1/2012 | Kiyosawa et al. | 348/234 |
| 2012/0070083 A1* | 3/2012 | Ishiga et al. | 382/167 |
| 2012/0098991 A1* | 4/2012 | Nomura | 348/222.1 |
| 2013/0077862 A1* | 3/2013 | Nomura et al. | 382/167 |
| 2014/0044374 A1* | 2/2014 | Terasawa | 382/254 |
| 2014/0139706 A1* | 5/2014 | Jang et al. | 348/241 |

OTHER PUBLICATIONS

Gunturk, Bahadir K. et al., "Demosaicking: Color Filter Array Interpolation," *IEEE Signal Processing Magazine*, Jan. 2005, pp. 44-54, vol. 22, Issue 1, IEEE, Piscataway, New Jersey, USA.

Hirakawa, Keigo et al., "Adaptive Homogeneity-Directed Demosaicing Algorithm," *IEEE Transactions on Image Processing*, Mar. 2005, pp. 360-369, vol. 14, No. 3, IEEE, Piscataway, New Jersey, USA.

* cited by examiner

METHOD AND DEVICE FOR GENERATING A DIGITAL IMAGE BASED UPON A SELECTED SET OF CHROMINANCE GROUPS

TECHNICAL FIELD

The present invention relates generally to integrated circuit devices, and in particular, to methods of and devices for generating a digital image.

BACKGROUND

Receptors in the human eye are only capable of detecting light having wavelengths between approximately 400 nanometers (nm) and 700 nm. These receptors are of three different types, including receptors for red (R) light, receptors for green (G) light and receptors for blue (B) light. The representation of an image based upon the intensity of red, blue and green color components is commonly referred to as RGB. If a single wavelength of light is observed, the relative responses of these three types of receptors allow us to discern what is commonly referred to as the color of the light. This phenomenon is extremely useful in color video processing because it enables generating a range of colors by adding together various proportions of light from just three wavelengths.

An image to be displayed is broken down into an array of picture elements or pixels to be displayed. Generally, each pixel displays a proportion of red, green and blue light depending on the signals to be displayed. Many image detecting devices include a sensor which will detect only one color component for each pixel. However, when rendering a color image, the two missing color components at each pixel have to be interpolated based upon color components of other pixels. If this process is not performed appropriately, the produced image quality will be degraded by various aberrations, such as highly visible zipper effects and false color artifacts. A zipper effect refers to abrupt and unnatural changes in intensity between neighboring pixels. False color artifacts correspond to dots or streaks of colors which do not exist in the original image.

SUMMARY

A method of generating a digital image is described. The method comprises detecting light from a scene to form an image; detecting an aberration in the image; and implementing a color filter array interpolator based upon the detected aberration in the image.

Another method of generating a digital image comprises establishing a plurality of implementations of a color filter array interpolator for generating a digital image; detecting light from a scene to from an image by way of a lens; detecting a mismatch between a resolution of the lens and a sensor array; and selecting an implementation of the plurality of implementations of a color filter array interpolator based upon the detection of the mismatch.

A device for generating a digital image is also described. The device comprises a lens for detecting light from a scene to form an image; a sensor array for generating pixels associated with the image; and a processing circuit detecting a mismatch between a resolution of the lens and the sensor array, and implementing a color filter array interpolator based upon the detection of the mismatch.

DETAILED DESCRIPTION

Figure 1:
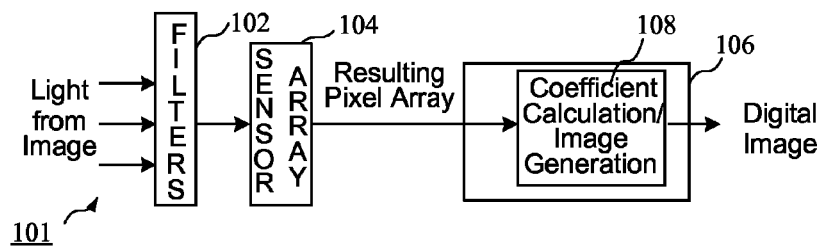
FIG. 1 is a block diagram of a circuit for generating a digital image.

Turning first to FIG. 1, a block diagram of a circuit for reducing aberrations in a digital image is shown. In particular, an image detection circuit 101 of FIG. 1 has color filters 102 coupled to receive light from a scene for which a digital image is to be generated and a sensor array 104. Common color filter arrays typically include red, green, blue, or cyan, magenta, yellow, or cyan, magenta, yellow, green color filters. It should be noted that, while various implementations described below relate to red, green, blue color filter arrays by way of example, the implementations may also apply to other color filter arrays. It should also be noted that while a three color array is described, the circuit and methods may also be applied to a four color filter array, as will be described in more detail below. An output of the color filter array 102 is provided to the sensor array 104. The sensor array 104 comprises a sensor in each block representing a pixel of a matrix to generate a resulting pixel array, as will be described in more detail in reference to FIG. 2. Common image sensors which may be implemented in the sensor array include a charge coupled device (CCD) or a complementary metal oxide semiconductor (CMOS) device. The resulting pixel array is coupled to a processing device 106 which comprises coefficient calculation/image generation block 108.

As will be described in more detail in reference to the remaining figures, the processing device 106 improves the quality of images generated by a device from light detected from a scene. The processing device 106 may be implemented in any type of digital imaging device. Further, the processing device may be implemented in a single integrated circuit device, or a plurality of integrated circuit devices of the digital imaging device. One type of integrated circuit device which may be used to implement the circuits and methods of generating a digital image may be a device having programmable resources, such as the device described in more detail in reference to FIGS. 13 and 14.

Figure 2:
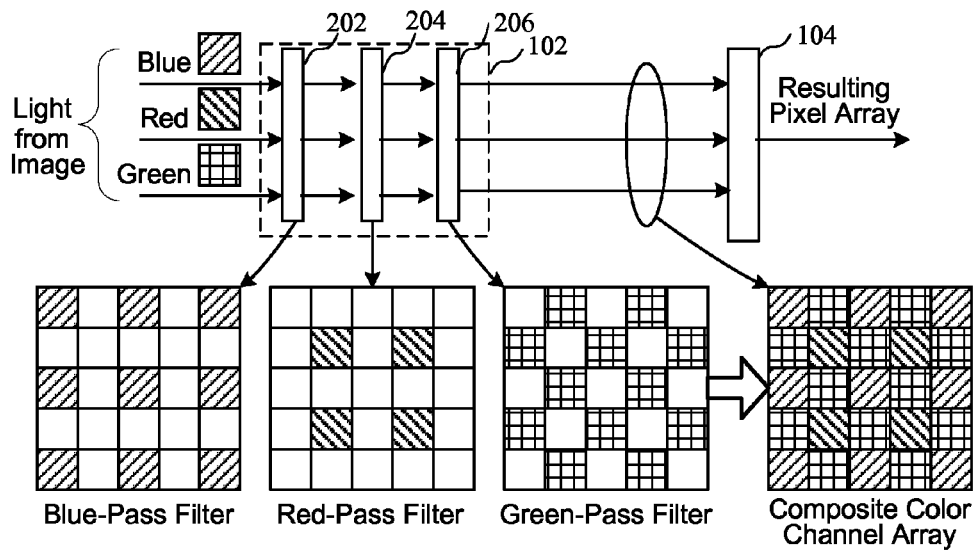
FIG. 2 is a diagram showing the generation of a pixel array.

Many digital imaging devices, such digital still cameras, acquire images using an image sensor overlaid with color filters as shown in FIG. 2, such that each sensor pixel of the image sensor samples only one of the three primary colors (e.g. red, green and blue), or cyan, magenta, yellow and optionally green for example. As shown in FIG. 2, the color filters 102 may comprise a plurality of filters 202-206 for creating a composite color channel array detected by the 2-dimensional sensor array 104. According to the example of FIG. 2, a first filter 202 comprises a blue-pass filter. That is, only frequencies of light corresponding to the color blue will be passed in the boxes designated by a forward slash pattern. The other boxes (shown with no pattern) will pass all of the frequencies of light from the image which are incident at the location of the other boxes. Similarly, a second filter 204 comprises a red-pass filter which will only enable frequencies of light corresponding to the color red to pass in the boxes designated by a backward slash pattern. Finally, a third filter 206 having a green-pass filter will only enable the frequencies of light corresponding to the color green to pass in the boxes designated by a cross-hatch pattern. The light from an image is sampled and the composite of the filters 202-206 provides color channels representing intensity values to achieve the composite color channel array as is shown in FIG. 2. That is, the composite of the three filters 202-206 will allow only one color to pass in each box of the matrix. Accordingly, the resulting pixel array, also commonly referred to as a color filter array (CFA) sub-sampled image, detected by the sensor array 104 comprises a matrix associated with the image, where each pixel of the matrix is represented only by a single color component. The particular arrangement of color components as shown in FIG. 2 is the commonly referred to as a Bayer CFA pattern.

As will be described in more detail below, the intensity values of the two missing color components at each pixel must be interpolated from known intensity values in neighboring pixels to render a complete multi-color image from the resulting pixel array. This process, commonly referred to as demosaicking, is one of the critical tasks in digital image processing. If demosaicking is not performed appropriately, the produced image quality will be degraded by highly visible zipper effects and false color artifacts. While false color artifacts may appear anywhere on an image, zipper effects may appear in either a vertical orientation or a horizontal orientation. Both aberrations are due to aliasing (i.e. the fact that sample positions of sub-sampled color channels are offset spatially, and high contrast edges lying between the sampling positions that may affect color components used in the interpolation process differently).

While a 5×5 matrix is preferably used to calculate weights and interpolate values for missing color components in a given pixel, it should be understood that methods may be adapted to be performed on a larger matrix than a 5×5 matrix, and the overall image comprises many more pixels than the 5×5 array of pixels. While references are made to single images which are generated, it should be understood that the light from an image may be sampled at a given frequency, where the sampled data may be processed to generate video data.

As the human eye is at least twice as sensitive to green light than to blue or red light, the green color channel is sampled with twice the frequency of the blue and red color channels. In the Bayer CFA pattern shown in FIG. 2, green samples are located on a quincunx lattice, while red and blue samples are obtained on rectangular lattices. That is, the green samples are obtained in every other pixel in each row and column, where the rows and columns are staggered to form a checker-based pattern. The red and blue samples are obtained in every other pixel (not having a green sample) in every other row and column, with the red and blue color components in alternating rows and columns. Therefore, the interpolation of the green color component for a given pixel which does not have a green color component usually differs from the interpolation of red and blue color components.

The purpose of interpolation is to find missing color components for a given pixel. Numerous techniques have been developed for CFA interpolation. These techniques offer a wide range of tradeoffs between the complexity and the quality of results. The complexity is often measured as instructions per pixel or some function of silicon real estate, such as gate counts. The quality of results is predominantly measured as a Signal-to-Noise Ratio (SNR) or a Peak Signal-to-Noise Ratio. However, many conventional methods either lead to significant aberrations in the digital image or require significant processing capacity to perform the interpolation. This significant processing capacity required may limit the devices in which the methods may be implemented or increase the cost of implementing the methods. De-focused, or imperfect lenses in an optical system, low-light exposure and quick motion can lead to blurred, noisy images or video streams. In a digital camera, cell-phone, security camera or studio recording environment, the captured images and video stream may be enhanced to improve visual quality. This enhancement process involves noise reduction and edge enhancement.

Various circuits and methods set forth below enable dynamically selecting CFA Interpolation architectures on a picture-by-picture basis according to variant scene conditions with correlation to implementation conditions defined by the optics and sensor interfaces in a camera system. It should be noted that a picture could comprises different amounts or arrangements of pixel data, and could include one or more frames, fields, or screens, for example.

Chromatic aberrations pose a unique challenge for CFA interpolation techniques. Advanced CFA interpolation techniques attempt to reduce color artifacts, and to infer resolution enhanced contours from sub-sampled color-channels by combining information carried on different color channels. As chromatic aberrations separate the intensity transitions of different color channels, false contours are identified. Color channel saturation occurs when one or more color channels for a particular pixel reach the maximum value that could be represented digitally. Saturation is typically due to overexposure, and leads to color shifts towards yellow, cyan or magenta, and ultimately to white. Whereas saturation is typically gradual, a faithful rendering of high contrast shadows in saturated areas pose another challenge for CFA interpolation techniques. Thin darker lines may cause one of the colors to return to a linear, unsaturated region of the sensor, while other channels remain saturated. This represents a color shift, where advanced CFA interpolation techniques (which suppress sharp chrominance transitions) may interpret as falsely detected specks on the image. The various methods and circuits set forth below provide a number of solutions, including means for detecting different photographic situations and enabling an adaptive CFA interpolation technique.

Figure 3:
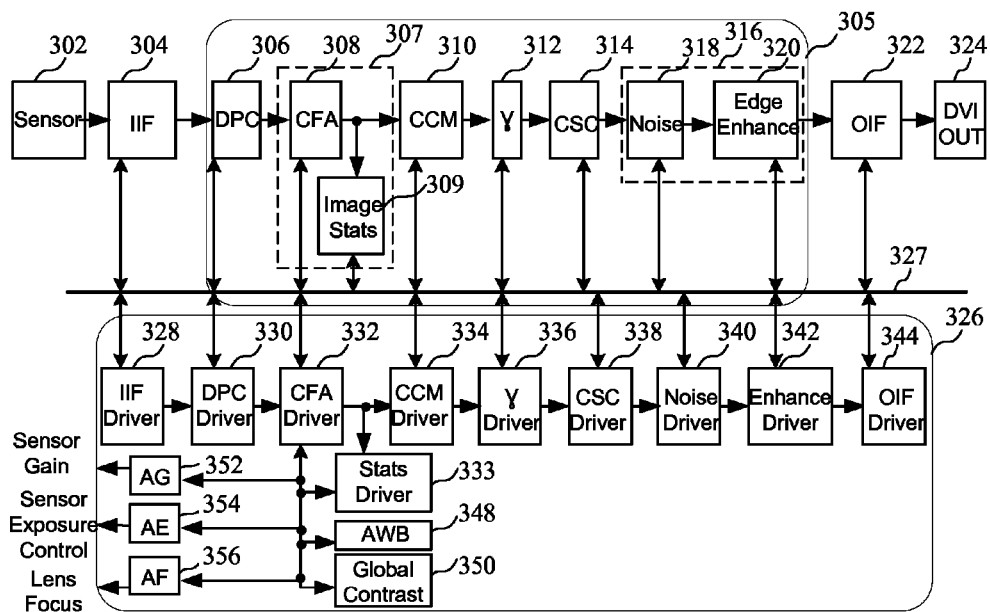
FIG. 3 is a block diagram of a circuit enabling adaptive filtering.

Turning now to FIG. 3, a block diagram of a circuit enabling adaptive filtering is shown. A sensor 302 is coupled to detect light from an image, and could be for example the image capture circuit 101. A resulting pixel array is coupled to an input interface (IIF) 304. The input interface could be an AXI4-S interface, for example. An image processing circuit 305 comprises a defective pixel correction (DPC) block 306, the output of which is coupled to an image conversion circuit 307 comprising a CFA conversion circuit 308 and an image statistics block 309 which stores an output of the CFA conversion circuit 308. The DPC block corrects any errors in the image, such as when a particular sensor may be repeatedly generating the same intensity value, for example. The color filter array conversion circuit converts the detected input intensity value to an RGB value. That is, the output of the sensor comprises an intensity value associated with a single color, for example red, green or blue, where the other colors are interpolated based upon the detected colors. An example of a method of interpolating missing colors in an array may be found in U.S. Pat. No. 8,400,533, which is incorporated by reference in this application in its entirety. The color filter array interpolation process and the selection of a color filter array will be described in more detail below by the CFA conversion circuit 308.

A color correction matrix (CCM) circuit 310 detects changes in color, and provides what is normally known as color casting. When light from an image is detected, such as by an incandescent or fluorescent light, or by light in the late afternoon causing red hues, the RBG spectrum may be offset. The CCM circuit 310 provides color balancing to convert the external light to white. A gamma correction circuit 312 receives the output of the CCM circuit, and compensates for the non-linearity of a display. Because perceived intensity of an image is non-linear, the gamma correction circuit 312 provides an offset to compensate for the non-linearity, which typically relates to intensity. The output of the gamma correction circuit 312 is coupled to a color space converter (CSC) circuit 314, which converts the RGB signal to a YCrCb signal having a luminance value and two chrominance values, which is the actual data associated with a YUV signal as described above. The YCrCb signal is coupled to a CFA enhancement circuit 316 comprising a noise reduction block 318 and an edge enhancement block 320. An output of the CFA enhancement circuit 316 is provided as an image to an output device 324 by way of an output interface 322

Various software components 326 also enable the operation of the circuit blocks of FIG. 3 by way of a bus 327. In particular, IIF driver 328, DPC driver 330, CFA driver 332, a Stats driver 333, CCM driver 334, Gamma driver 336, CSC driver 338, Noise driver 340, Enhance driver 342, and OIF driver 334 enable the operation of corresponding circuit elements set forth above. Other software elements include an auto white balancing (AWB) module 348 which enables white objects to appear white, and a global contrast module 350 which is applied to an entire picture to provide appropriate luminance adjustment. Blocks 352, 354 and 356 enable generating sensor gain, sensor exposure control and lens focus elements, respectively.

Figure 4:
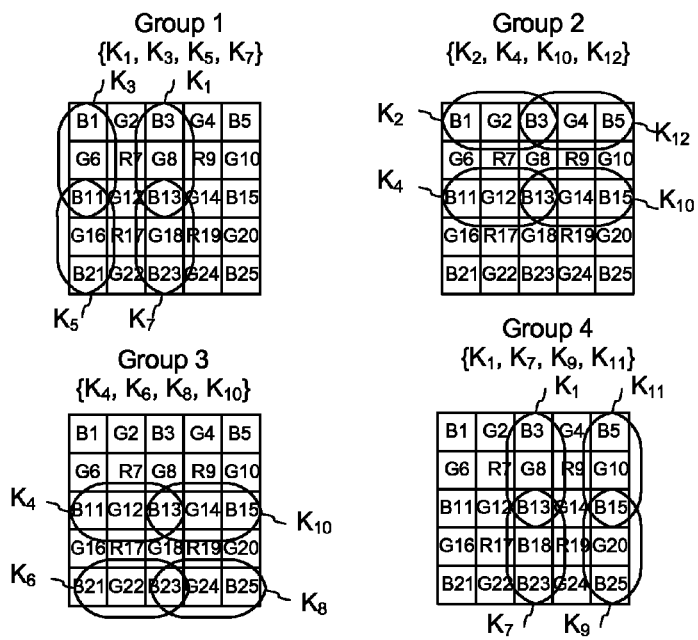
FIG. 4 is a diagram showing 12 chrominance groups processed by the system of FIG. 1.
Figure 5:
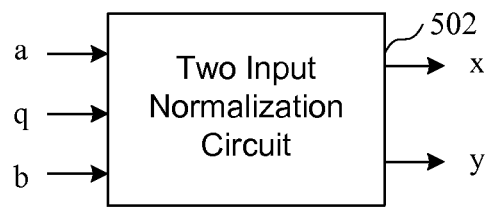
FIG. 5 is a block diagram of a circuit for providing two-input normalization.
Figure 6:
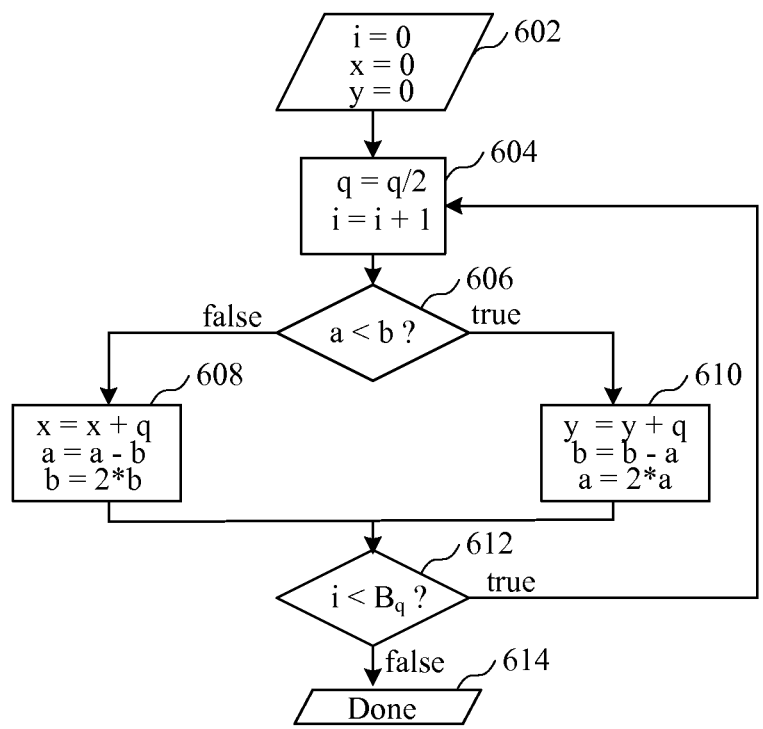
FIG. 6 is a flowchart showing the operation of the circuit of FIG. 5 for providing two-input normalization.

One implementation of interpolating missing colors will be described in reference to FIGS. 4-8. Preferably, the green color component in pixels lacking intensity values for green color components is interpolated first. In order to interpolate the green color component, four chrominance groups are established as shown in FIG. 4, where the blocks of the 5×5 matrix are numbered from 1-25 and have a letter prefix according to the color component which is known for that block. A chrominance value is calculated as a difference between a green intensity value and the blue or red intensity values for a certain group of pixels. For example, a chrominance value $K_1$ is calculated such that $K_1=G8-0.5(B3+B13)$. That is, the chrominance value is generated based upon a center green value and two adjacent red or blue values of three consecutive pixels, where the red or blue values may be either horizontally adjacent or vertically adjacent with respect to a given green value. Mean values ($m_n$), sums of absolute differences ($SAD_n$), and spatial differences ($SD_n$) are then calculated for the four chrominance groups (n=1,2,3,4) shown in FIG. 4. That is, each chrominance group comprises 4 chrominance values, and a mean value of the 4 chrominance values is determined. The sums of absolute differences are calculated using the determined mean values according to Equation (1):

$$SAD_n = \sum_{i=1}^{4} |K_{G_i,n} - m_{G_n}|. \quad (1)$$

The spatial differences $SD_n$ are then calculated as set forth in Equation (2):

$$SD_n = \begin{cases} |B_3 - B_{13}| + |B_{13} - B_{23}| & n = 1, 4 \\ |B_{11} - B_{13}| + |B_{13} - B_{15}| & n = 2, 3 \end{cases} \quad (2)$$

Weights for each of the 4 groups are then calculated as shown in Equation (3):

$$w_n = \frac{1}{\varepsilon + SAD_n + SD_n}, \quad (3)$$

for $n = 1, 2, 3, 4,$ where $\varepsilon = 1$

Calculating weights based upon the sum of absolute differences rather than a variance, for example, will reduce the arithmetic requirements. That is, because the determination of a variance requires a square root calculation, the calculation of weights based upon a variance calculation requires significant arithmetic operations. Any reduction in arithmetic operations will not only reduce the processing time, but also the hardware necessary to calculate the weights.

As can be seen in FIG. 4 and Equation (3), the calculated weights comprise vertical weights associated with vertical chrominance groups and horizontal weights associated with horizontal chrominance groups. The correction of aberrations in a vertical orientation is more difficult than the correction of aberrations in the horizontal orientation. That is, because the data for the image is evaluated on a row-by-row basis, corrections involving horizontal data do not require memory buffers and can be performed while the data is loaded. As will be described in more detail below, horizontal post-processing may be easily performed after a complete digital image having three color components for each pixel is generated. Therefore, the calculation of weights is tuned to increase the vertical weights. That is, the vertical weights are increased with respect to the horizontal weights to provide additional correction for aberrations which may appear in columns of pixels (i.e. a vertical orientation) which would not be corrected by horizontal post-processing. For example, the weights corresponding to vertically-oriented chrominance groups (i.e. $w_j$ and $w_4$ corresponding to Chrominance Groups 1 and 4 of FIG. 4) may be multiplied by 2.

Normalized weights are then defined as shown in Equation (4):

$$\overline{w}_n = \frac{w_n}{\sum_{k=1}^{4} w_k}, \quad (4)$$

where k is a chrominance group. However, the weight normalization step in Equation (4) requires the use of a wide divider, which requires a significant amount of hardware to implement. Instead of using a divider and 4 multipliers to calculate the normalized weights as would be required by the Equation (4), a weight distribution network may be used. Various processing techniques for processing video and other data use the weighed sum operation as set forth in Equation (5):

$$s = \sum_N w_i x_i; \quad (5)$$

where "$w_i$" are the weights with which "$x_i$" are qualified and the sum of the weights is equal to one. However, if the sum of the weights is not equal to one, normalized weights $$\overline{w}_i = \frac{w_i}{s_w}$$

should be used instead of $w_i$ in Equation (5).

However, the calculation of N normalized weights requires N division operations. In hardware applications, such a calculation of normalized weights may be prohibitively costly. Assuming that the number of weights $N=2^n$ where n is a positive integer, a method of normalizing weights enables normalizing weights by iterative sub-division, without division, according to one implementation of the present invention. Before providing a more general framework for the weight normalization technique according to the present invention, the case where only two weights have to be normalized (i.e. N=2, n=1) will be considered first. "a" and "b" denote the weights to be normalized, "x" and "y" denote the corresponding normalized values, and "q" is the expected sum of "x" and "y" such that:

$$\frac{x}{y} = \frac{a}{b}, \text{ and } x+y = q, \quad (6)$$

where "q" shall be set to "1" for the normalization of two weights.

The normalized weights for weights "x" and "y" are then calculated in an iterative fashion, with each step refining the results with another binary digit. In particular, "i," "x" and "y" are initialized to a value of "0" at a block 602. The value of "q" is set equal to "q/2" and "i" is incremented to "i+1" at a block 604. It is then determined whether a<b at a block 606. If so, the values of "x," "y," "a," and "b" are modified such that "x=x+q," "a=a−b," and "b=b*2." If not, the values are modified such that "y=y+q," "b=b−a," and "a=2*a." It is then determined whether i<$B_q$, where "$B_q$" denotes the number of bits used to represent "q," at a block 612. If so, the process returns to block 604. Otherwise, the process is finished. In a digital system where "q" is represented as a binary integer, the process converges in "$B_q$" cycles.

Figure 7:
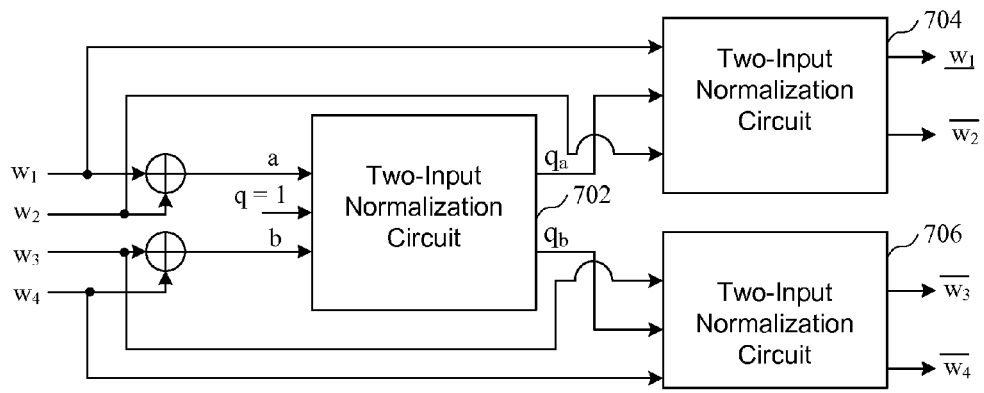
FIG. 7 is a block diagram of a cascading circuit for providing normalization.

The method of normalizing weights may be extended to a number of weights being some other multiple of 2. In particular, the block diagram of FIG. 7 shows a cascading circuit for providing normalization for N=4. Cascading the normalization blocks of FIG. 6 allows the implementation of the normalization of weights in cases where $N=2^n$ and N≥2. The first step of normalization for $N=2^n$ takes place by splitting the weights into two groups of $N=2^{n-1}$ elements, and combining the weights in the two groups. The combined weights are inputs "a" and "b" to weight normalization circuit 702, which will divide the expected sum, "q", into "$q_a$" and "$q_b$." Two-input normalizers 704 and 706 in the second stage will further subdivide "$q_a$" and "$q_b$" according to weights provided to the respective inputs "a" and "b." Accordingly, the cascaded two-input normalization circuit can be extended to normalize weights for any number of $N=2^n$.

Because division by two in hardware can be implemented at no cost, the method for weight normalization set forth above can be mapped easily to either parallel or serial hardware implementations using only comparators, multiplexers and adders/subtractors. Additional details for implementing weight normalization according to the present invention may be found in U.S. Pat. No. 8,484,267, the entire patent of which is incorporated herein by reference.

Finally, after the normalized weights are calculated as set forth in Equation 4, the green color component $G_{13}$ is calculated for block 13:

$$G_{13} = B_{13} + \sum_{i=1}^{4} \overline{w}_n ave_n, \quad (7)$$

$$n = 1, 2, 3, 4,$$

$$\varepsilon = 1$$

The other missing green color components for red blocks are similarly calculated based upon the value for red color components, where red intensity values are substituted for the blue intensity values in Equation (7). The other values of missing green color components are calculated for the 5×5 matrix by establishing chrominance groups as described in reference to FIG. 3, where the missing green color component is in the center of another 5×5 matrix.

Once all of the green color components are determined for the original 5×5 matrix, missing red and blue color components of the original 5×5 matrix may then be interpolated, using a technique called the smooth hue transition technique. The smooth hue transition heuristics take advantage of hue or chrominance values (also commonly called chroma values) typically having lower spatial frequencies than those of luminance values, as well as the human eye being less sensitive to changes in hue than in intensity. Using sample positions introduced in FIG. 4, blue pixel interpolation is performed according to the smooth hue transition technique as set forth in Equations (8):

$$B12 = G12/2*(B11/G11 + B13/G13)$$

$$B16 = G16/2*(B11/G11 + B21/G21)$$

$$B17 = G17/4*(B11/G11 + B13/G13 + B21/G21 + B23/G23). \quad (8)$$

That is, for each pixel (for which a blue color component is to be interpolated) with two adjacent pixels in a row having a blue color component, such as pixel 7, the B7 color component is interpolated based upon the blue color components in the two adjacent pixels in the row. For each pixel with two adjacent pixels having a blue color component in a column, such as pixel 13, the blue color component is interpolated based upon the blue color components in the two adjacent pixels in the column. For a pixel that does not have any adjacent pixels having known blue color components in the row or column containing the pixel, such as pixel 12, the blue color component is calculated based upon the four blue color components which are diagonal neighbors of the pixel. Similarly, red pixel interpolation is performed according to Equations (9):

$$R8=G8/2*(R7/G7+R9/G9)$$

$$R12=G12/2*(R7/G7+R17/G17)$$

$$R13=G13/4*(R7/G7+R9/G9+R17/G17+R19/G19). \quad (9)$$

The advantage of the smooth hue transition method is an improved suppression of color artifacts. However, the division operations required in the Equations (8) and (9) may introduce outlier specks, and pose a problem in very large scale integration (VLSI) implementations. Also, a digital signal processor (DSP) implementation is hindered by frequent branching due to the handling of the division by 0 exception.

Accordingly, a smooth hue transition with logarithmic domain technique may be used in interpolating red and blue color components. Subtraction is often used in place of division to alleviate the problems stemming from division operations. The advantages of the smooth hue transition with logarithmic domain technique include an improved suppression of color artifacts, reduced number of arithmetic operations, a calculation requiring only additions and subtractions, and the use of only 2 line buffers.

Blue pixel interpolation using a smooth hue transition with logarithmic domain technique is performed according to Equations (10):

$$B12=G12+0.5*(B11-G11+B13-G13)$$

$$B6=G6+0.5*(B11-G11+B21-G21)$$

$$B7=G7+0.5*(B11-G11+B13-G13+B21-G21+B23-G23) \quad (10)$$

Similarly, red pixel interpolation a smooth hue transition with logarithmic domain technique is performed according to Equations (11):

$$R8=G8+0.5*(R7-G7+R9-G9)$$

$$R12=G12+0.5*(R7-G7+R17-G17)$$

$$R13=G13+0.5*(R7-G7+R9-G9+R17-G17+R19-G19) \quad (11)$$

It should be noted that the various equations set forth above would equally apply to a cyan, magenta, yellow representation. Further, the equations would also apply to a four color representation, where the various missing color components would be generated based upon either two vertically adjacent pixels, two horizontally adjacent pixels, or four diagonally adjacent pixels as set forth in the equations above.

Figure 8:
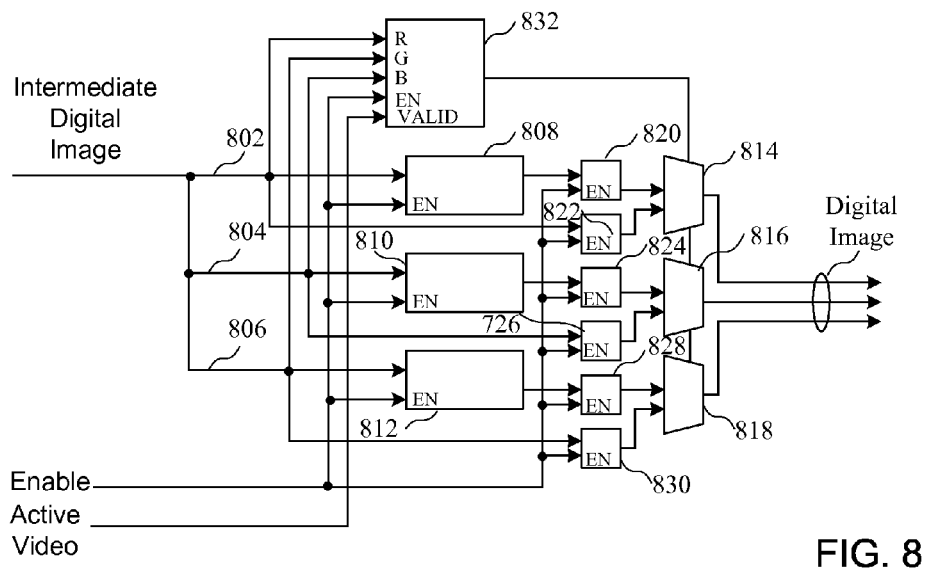
FIG. 8 is a block diagram of a circuit for providing horizontal zipper effect suppression implemented by a horizontal post-processing block of the system of FIG. 1.

After generating an intermediate digital image having pixels including a color component for each of the color components based upon the calculated weights as shown in FIG. 1, the intermediate digital image is further processed using an additional horizontal processing stage to suppress horizontal zipper effects. As shown in FIG. 8, a horizontal post-processing block, which could be implemented in the processing device 106 for example, receives a red color component 802, a blue color component 804, and a green color component 806 which are coupled to a corresponding low-pass filter. That is, the red color component is coupled to a low-pass filter 808, the blue color component is coupled to a low-pass filter 810, and the green color component is coupled to the low-pass filter 812. Each color component may comprise a serial data stream of intensity values associated with a color for each pixel of an array.

A plurality of registers is coupled to receive the outputs of the various filters. In particular, a register 820 is coupled to receive the output of the low-pass filter 808, while a register 822 is delaying the original red samples, so that the filtered and the non-filtered red samples are in phase. Similarly, a register 824 is coupled to receive the output of the low-pass filter 810, and a register 826 is delaying the original blue samples. Finally, a register 828 is coupled to receive the output of the low-pass filter 812, while a register 830 is delaying the original green samples. A multiplexer network having multiplexers 814-818 is coupled to select, for each pixel, the outputs of the color-pass registers or the outputs of the corresponding low pass filters. Control block 832 evaluates the data and determines whether to select the filtered data or the unfiltered data. Registers in block 832 should be deep enough to store at least one color component for at least 3 pixel values of a row to enable identifying horizontally zipper effects as set forth below.

The multiplexing network is controlled by a control block 832. Each of the low-pass filters 808-812, the registers 820-830, and the control block 832 are enabled by an enable signal. The control block 832 is also coupled to receive an active video signal indicating that the data coupled to the horizontal post processing block is valid data. The resulting digital image may comprise pixels having both filtered and unfiltered pixel data.

The control block 832 evaluates the intermediate digital image to determine whether there is any horizontal zipper effect which could be eliminated, and controls multiplexers 814-818 to either pass on the original input color components generated at the outputs of filters 802-806 or filtered color components at the outputs of filters 808-812. The control block 832 may be a simplified Nyquist frequency detector block, for example, where the Nyquist frequency refers to the spatial sampling frequency, $f_s$, of the green channel, or luminance channel corresponding to the RGB or CMY inputs. The filters 808-812 may comprise low-pass filters which are designed to suppress the Nyquist frequency but have minimal attenuation below $f_s/2$.

The determination of a zipper effect is a problem associated with luminance. That is, because the zipper effect relates to abrupt changes in intensity between neighboring pixels, the zipper effect is more easily detected by luminance values. Therefore, in order to identify a zipper effect, the original RGB values are converted to luminance (Y) values according to the converter Equation (12):

$$Y=0.299R+0.587G+0.114B. \quad (12)$$

However, in order to reduce the complexity of the hardware required to make the conversion to luminance values, the luminance values are generated instead according to the converter Equation (13):

$$Y=0.25R+0.625G+0.125B, \quad (13)$$

where multipliers required by Equation (12) may be replaced by bit-shift operations, making the RGB-to-Y converter easier to implement in hardware.

RGB-to-Y conversion may be followed by kerning, or quantizing Y down to a programmable number of bits, Y'. Kerning is a truncation process where a programmable number of least significant bits (LSBs) are dropped. By dropping some of the less significant bits, local noise is suppressed to prevent the outputs from frequently switching between the filtered and the original outputs. According to one implementation of the invention, N−4 bits are used to represent the Y' values, where N is the number of bits in the binary representation of the original sensor data.

The presence of Nyquist frequency, which would indicate a zipper effect condition, is detected by applying Equation (14):

$$sgn(Y'_{k-2}-Y'_{k-1}) XOR\ sgn(Y'_{k-1}-Y'_{k}), \quad (14)$$

where the "sgn" function is a mathematical function that extracts the sign of a real number. The result of Equation (14) indicates whether the intensity has three alternating high and low values. Equation (14) may be implemented by the following pseudo-code:

If $((Y_{t-2} \leq Y_{t-1})$ and $(Y_{t-1} \leq Y_t))$ or $((Y_{t-2} \geq Y_{t-1})$ and $(Y_{t-1} \geq Y_t))$ then
 $Ro_t=Ri_t$
 $Go_t=Gi_t$
 $Bo_t=Bi_t$
else
 $Ro_t=Rf_t$
 $Go_t=Gf_t$
 $Bo_t=Bf_t$, where $Ri_t, Gi_t, Bi_t$ are the input signals, and $Ro_t, Go_t, Bo_t$ are the current red, green and blue outputs at a time t. According to the pseudo-code, if the luminance values are continuously increasing or equal or continuously decreasing or equal for any three consecutive pixels, no zipper effect is detected in those pixels. Otherwise, alternating high and low values are detected in 3 consecutive pixels, and the filtered values are selected to eliminate the zipper effect.

The filtered values output by the low-pass filters 808-812 may be calculated according to Equation (15):

$$Rf_{t-1}=0.25*Ri_{t-2}+0.5*Ri_{t-1}+0.25*Ri_t$$

$$Gf_{t-1}=0.25*Gi_{t-2}+0.5*Gi_{t-1}+0.25*Gi_t$$

$$Bf_{t-1}=0.25*Bi_{t-2}+0.5*Bi_{t-1}+0.25*Bi_t. \quad (15)$$

Because the horizontal post-processing stage only performs horizontal processing, no line buffers are necessary. That is, because the data associated with the image is processed based upon rows of the matrix, the data is already required to be stored in memory buffers, and no additional memory buffers are needed. Because the low-pass filters may be implemented using coefficients (0.25, 0.5, 0.25) as set forth above in Equation (15), the circuit of FIG. 8 may be implemented without multipliers. Accordingly, the implementation of the horizontal post-processing makes the circuits and methods of the present invention cost effective, and particularly in devices which may have limited circuit resources, such as programmable logic devices.

Figure 9:
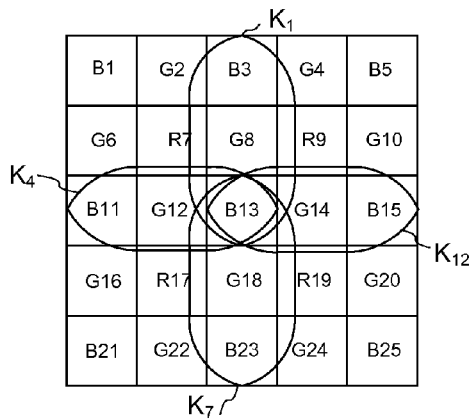
FIG. 9 is a diagram showing 4 chrominance groups to be used in place of the 12 chrominance groups of FIG. 4.

While the use of chrominance groups set forth above in reference to FIGS. 4-8 comprising a Chrominance Variance Minimization (CVM) CFA technique may be useful for reducing chrominance artifacts in digital images, different chrominance groups may be beneficial in reducing other types of aberrations, such as zipper effects. A diagram of FIG. 9 shows 4 chrominance groups, where group 1={$K_1, K_1, K_7, K_7$}, group 2={$K_4, K_4, K_{12}, K_{12}$}, group 3={$K_4, K_4, K_{12}, K_{12}$}, and group 4={$K_1, K_1, K_7, K_7$}. A number of trends have increased the demand for image sensor processing solutions, including image sensor processing resolution and camera miniaturization. However, these two trends have led to a mismatch in elements of an image processing device, and can lead to aberrations in digital images generated by the image processing device. Portable electronics such as cell phones and tablets as well as the miniaturization of medical instruments such as endoscopes require a miniaturization of the entire optical system. However, improving silicon processing technology enables ever smaller pixel pitch, resulting in optical systems with sensor resolution surpassing lens resolution, which leads to aberrations. A mismatch between sensor and optics resolution can be detected by the lack of sharp transitions, or the lack of high frequencies in a detected image. Furthermore, chromatic aberrations can be detected by the lack of aligned edge transitions around the peripheries of the image. A typical image processing pipeline (which could be implemented in the processing device 106 for example), usually contains an Image Statistics module such as image statistics module 309 of FIG. 3, which can measure the low and high frequency content, chroma content/chroma gamut, chroma transitions, minimum and maximum values per color channel of images recorded by the sensor. Software components implemented by processing device 106 can have access to this information and control a CFA interpolation implementation which caters to different photographic situations. Accordingly, software implementing one or more of the methods set forth below can dynamically switch on a picture-by-picture (e.g. frame-by-frame, scene-by-scene) basis between different CFA stages to adapt the interpolation technique to changing photographic situations, such as lighting conditions. Because the software can dynamically switch on a scene-by-scene basis, the CFA interpolation technique may remain static for thousands of pictures.

CFA interpolation technique parameters may be set during assembly or maintenance to ensure the CFA sensor and optics (i.e. a lens) are matched to the specification task. Instead of using all chrominance groups as set forth in FIG. 4, the interpolation technique can be adapted to better accommodate zipper reduction than chrominance artifact reduction by switching to the central four chrominance inputs, where groups of FIG. 9 are group 1={$K_1, K_1, K_7, K_7$}, group 2={$K_4, K_4, K_{12}, K_{12}$}, group 3={$K_4, K_4, K_{12}, K_{12}$}, and group 4={$K_1, K_1, K_7, K_7$} and the G values are calculated as set forth above in FIGS. 4-8. According to one implementation, multiplexers select chrominance (Ki) inputs to be propagated to the variance and weight calculation modules. The multiplexers are controlled in response to the detection of a change in the content of an image, such as detecting a change in the photographic situation (e.g. lighting). Similarly, if Chrominance values (Ki) are calculated by using 0 for all non-green samples, the green channel interpolation module of the Chrominance Variance Minimization (CVM) CFA Interpolation technique effectively turns into a variant of Adaptive Homogeneity-Directed (AHD) Demosaicing, which is affected less by color channel saturation. This switch between the CVM CFA interpolation technique and AHD is implemented dynamically within pictures when dedicated logic senses color-channel saturation, and is implemented simply by keeping registers containing non-green samples in reset. Driving the reset lines of registers does not allocate additional resources in an FPGA.

Figure 10:
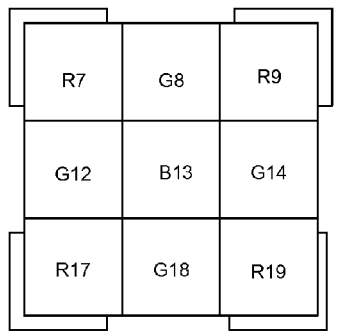
FIG. 10 is a diagram showing the generation of missing colors of a 3×3 memory array.

Turning now to FIG. 10, a diagram shows the generation of missing colors of a 3×3 memory array, where the boxes behind the red values are the green values which have already been calculated. After the missing Green components are interpolated as described above with respect to FIGS. 4-8

(referred to herein as Stage 1) except that the chrominance groups 1-4 as described in reference to FIG. 9 are used, the CVM interpolation technique interpolates missing R components at native B sites, as well as missing B components at native R sites (referred to herein as Stage 2). Finally, the interpolation technique interpolates missing R and B components at native G sites (Stage 3). The following methods improve the performance of Stage 2 and 3, as will now be described in more detail. For most CFA interpolation techniques, as well as for CVM, the red and blue interpolation at blue and red sites respectively are defined according to equations (16):

$$R13=G13+\frac{1}{4}[(R7-G7)+(R9-G9)+(R17-G17)+(R19-G19)], \text{ and}$$

$$B13=G13+\frac{1}{4}[(B7-G7)+(B9-G9)+(B17-G17)+(B19-G19)]$$

where G7, G9, G17, G19, and G13 are G pixels interpolated during Stage 1. On sharp edges with little Green but high Red and/or Blue contrast, the above interpolation technique may produce pronounced zipper and chroma artifacts. An improvement to Stage 2 for calculating red and blue values is through the use of only two of the four neighboring pixels in diagonally oblique positions, and preferably the ones with G values most similar to the G value of the center pixel. That is, when determining R13 for example, the differences between each of the G values G7, G9, G17 and G19 and the G value G13 would be compared. The two G values which are closest to G13 are selected and the average of the difference between the selected G values and their corresponding R values is added to G13 of equation 16. Accordingly, R13 will be determined according to the equation $R13=G13+\frac{1}{2}[(R7-G7)+(R19-G19)]$, where G7 and G19 of the group G7, G9, G17 and G19 are closest to G13. This technique produces superior results on images with sharp chroma transitions.

Figure 11:
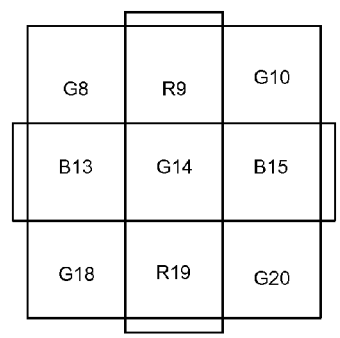
FIG. 11 is another diagram showing the generation of missing colors of a 3×3 memory array.

A similar method is implemented to improve the clarity and resolution of the interpolation of Red and Blue pixels at native Green sites in Stage 3. Instead of uniform averaging between the four closest neighbor, edge dependent, or edge adaptive interpolation is employed. For most CFA interpolation techniques, the red and blue interpolation at G sites as shown in FIG. 11 are defined according to equations (17):

$$R14=G14+\frac{1}{4}[(R13-G13)+(R9-G9)+(R15-G15)+(R19-G19)], \text{ and}$$

$$B14=G14+\frac{1}{4}(B13-G13)+(B9-G9)+(B15-G15)+(B19-G19)],$$

where G13, G9, G15, G19 are Green pixels interpolated by Stage 1, and R13, 89, R15, B19 are samples interpolated by Stage 2.

Turning now to FIG. 11, another diagram shows the generation of missing colors of a 3×3 memory array in the Stage 3 interpolation of Red and Blue pixels. Another improvement over the uniform averaging is edge dependent interpolation for Stage 3. If a horizontal edge lies between the scan lines above and below the pixel to be interpolated, the vertical difference will be greater than the horizontal. Formally, by introducing $dH=|G13-G15|$, and $dV=|G9-G19|$, edge dependent interpolation can be expressed by pseudocode (18):

if $(dH<dV)$, then $R14=G14+\frac{1}{2}[(R13-G13)+(R15-G15)],$ else $R14=G14+\frac{1}{2}[(R9-G9)+(R19-G19)].$ Unlike the modification in Stage 2 which considers any two of the 4 pixels used for calculating a missing pixel value, the modification in Stage 3 only considers pairs of pixels in either the horizontal direction (e.g. pixel blocks 13 and 15) or the vertical direction (pixel blocks 9 and 19), and takes the average of one of those two pairs. However, in the case of video processing (i.e., not static pictures but ones correlated in the temporal domain) at regions where dH and dV are close, flickering may appear. This problem is addressed by using a weighed sum instead of a binary decision. For edge adaptive interpolation, edge orientation is used as a weight when combining constituents according to equation (19):

$$R14=G14+\frac{1}{2}\{(dH+\epsilon)*[(R9-G9)+(R19-G19)]+(dV+\epsilon)*[(R13-G13)+(R15-G15)]\}1/(dH+dV+2\epsilon),$$

where $\epsilon$ is 1 LSB. The various techniques implemented according to FIGS. 4-10 may be implemented using the circuit of FIG. 3, which may be implemented in the coefficient calculation and image generate circuit 108 of FIG. 1.

Figure 12:
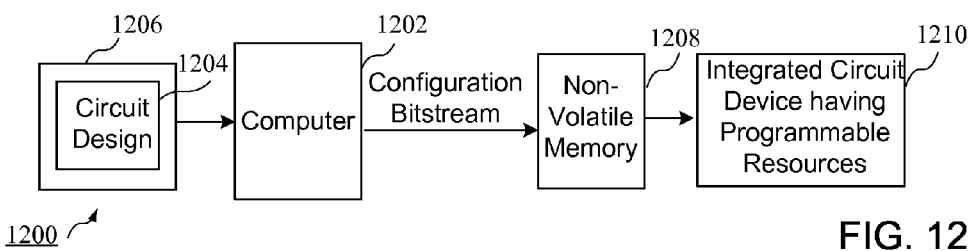
FIG. 12 is a block diagram of a system for programming a device having programmable resources.

Turning now to FIG. 12, a block diagram of a system for programming a device having programmable resources according to an implementation is shown. In particular, a computer 1202 is coupled to receive a circuit design 1204 from a memory 1206, and generates a configuration bitstream which is stored in the non-volatile memory 1206. As will be described in more detail below, the circuit design may be a high level design, such as a circuit design defined in a hardware description language (HDL). Also, the computer may be configured to run software that generates a configuration bitstream which is stored in the non-volatile memory 1208 and provided to an integrated circuit 1210 which may be a programmable integrated circuit, such as the integrated circuit described below in FIG. 12. As will be described in more detail below, bits of the configuration bitstream are used to configure programmable resources of the integrated circuit.

Figure 13:
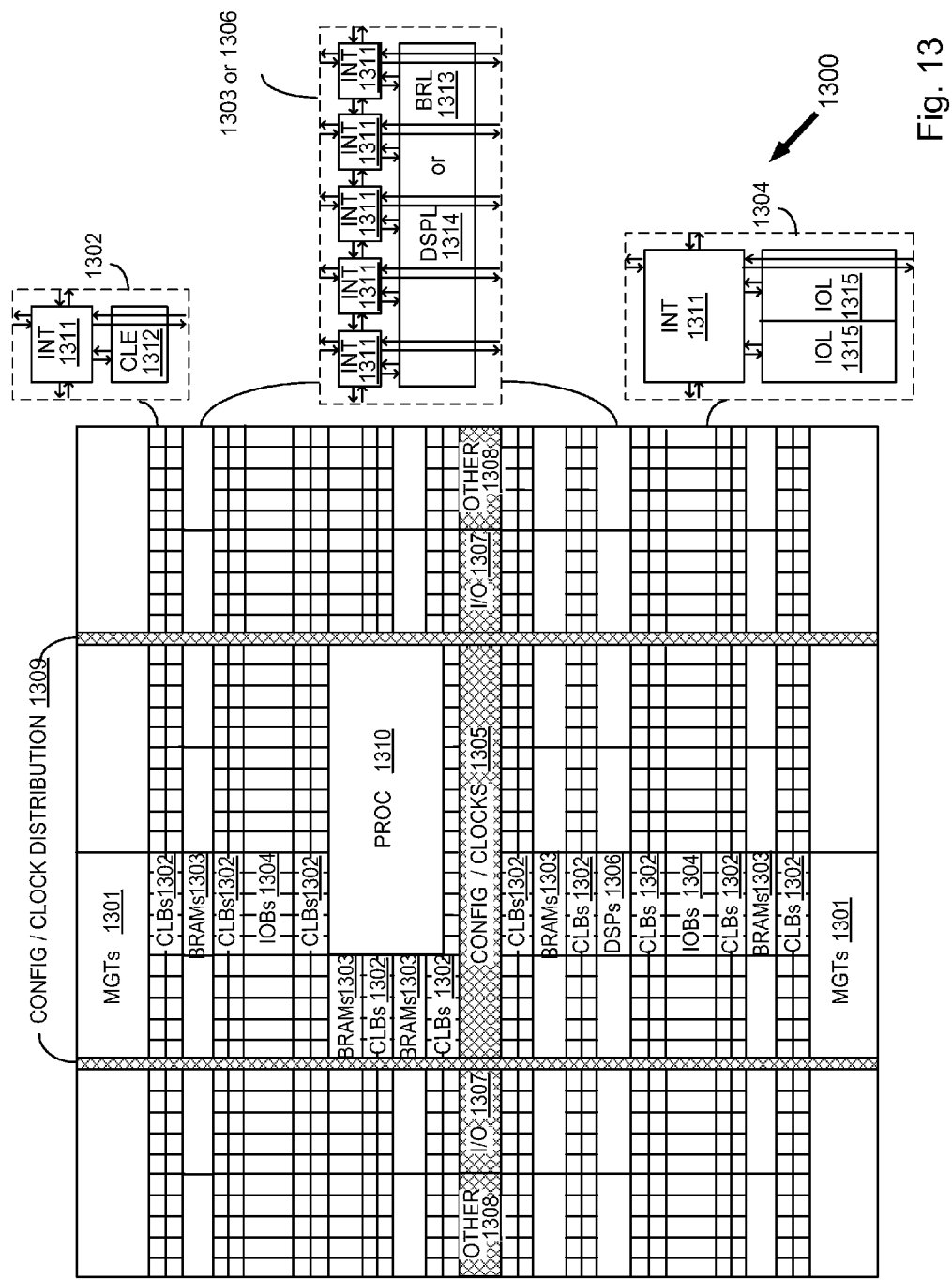
FIG. 13 is a block diagram of a device having programmable resources which may implement the circuits of FIGS. 1-8.

Turning now to FIG. 13, a block diagram of a device having programmable resources including the circuits of FIGS. 1-8 is shown. While devices having programmable resources may be implemented in any type of integrated circuit device, such as an application specific integrated circuit (ASIC) having programmable resources, other devices comprise dedicated programmable logic devices (PLDs). One type of PLD is the Complex Programmable Logic Device (CPLD). A CPLD includes two or more "function blocks" connected together and to input/output (I/O) resources by an interconnect switch matrix. Each function block of the CPLD includes a two-level AND/OR structure similar to that used in a Programmable Logic Array (PLA) or a Programmable Array Logic (PAL) device. Another type of PLD is a field programmable gate array (FPGA). In a typical FPGA, an array of configurable logic blocks (CLBs) is coupled to programmable input/output blocks (IOBs). The CLBs and IOBs are interconnected by a hierarchy of programmable routing resources. These CLBs, IOBs, and programmable routing resources are customized by loading a configuration bitstream, typically from off-chip memory, into configuration memory cells of the FPGA. For both of these types of programmable logic devices, the functionality of the device is controlled by configuration data bits of a configuration bitstream provided to the device for that purpose. The configuration data bits may be stored in volatile memory (e.g., static memory cells, as in FPGAs and some CPLDs), in non-volatile memory (e.g., Flash memory, as in some CPLDs), or in any other type of memory cell.

The device of FIG. 13 comprises an FPGA architecture 1300 having a large number of different programmable tiles including multi-gigabit transceivers (MGTs) 1301, CLBs 1302, random access memory blocks (BRAMs) 1303, input/output blocks (IOBs) 1304, configuration and clocking logic (CONFIG/CLOCKS) 1305, digital signal processing blocks (DSPs) 1306, specialized input/output blocks (I/O) 1307 (e.g., configuration ports and clock ports), and other programmable logic 1308 such as digital clock managers, analog-to-digital converters, system monitoring logic, and so forth. Some FPGAs also include dedicated processor blocks (PROC) 1310, which may be used to implement a software application, for example.

In some FPGAs, each programmable tile includes a programmable interconnect element (INT) 1311 having standardized connections to and from a corresponding interconnect element in each adjacent tile. Therefore, the programmable interconnect elements taken together implement the programmable interconnect structure for the illustrated FPGA. The programmable interconnect element 1311 also includes the connections to and from the programmable logic element within the same tile, as shown by the examples included at the top of FIG. 13.

For example, a CLB 1302 may include a configurable logic element (CLE) 1312 that may be programmed to implement user logic plus a single programmable interconnect element 1311. A BRAM 1303 may include a BRAM logic element (BRL) 1313 in addition to one or more programmable interconnect elements. The BRAM includes dedicated memory separate from the distributed RAM of a configuration logic block. Typically, the number of interconnect elements included in a tile depends on the height of the tile. In the pictured implementation, a BRAM tile has the same height as five CLBs, but other numbers may also be used. A DSP tile 1306 may include a DSP logic element (DSPL) 1314 in addition to an appropriate number of programmable interconnect elements. An IOB 1304 may include, for example, two instances of an input/output logic element (IOL) 1315 in addition to one instance of the programmable interconnect element 1311. The location of connections of the device is controlled by configuration data bits of a configuration bitstream provided to the device for that purpose. The programmable interconnects, in response to bits of a configuration bitstream, enable connections comprising interconnect lines to be used to couple the various signals to the circuits implemented in programmable logic, or other circuits such as BRAMs or the processor.

In the pictured implementation, a columnar area near the center of the die is used for configuration, clock, and other control logic. The config/clock distribution regions 1309 extending from this column are used to distribute the clocks and configuration signals across the breadth of the FPGA. Some FPGAs utilizing the architecture illustrated in FIG. 13 include additional logic blocks that disrupt the regular columnar structure making up a large part of the FPGA. The additional logic blocks may be programmable blocks and/or dedicated logic. For example, the processor block PROC 1310 shown in FIG. 13 spans several columns of CLBs and BRAMs.

Note that FIG. 13 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 13 are purely exemplary. For example, in an actual FPGA more than one adjacent column of CLBs is typically included wherever the CLBs appear in order to facilitate the efficient implementation of user logic. While the implementation of FIG. 13 relates to an integrated circuit having programmable resources, it should be understood that the circuits and methods set forth in more detail below could be implemented in any type of ASIC.

Figure 14:
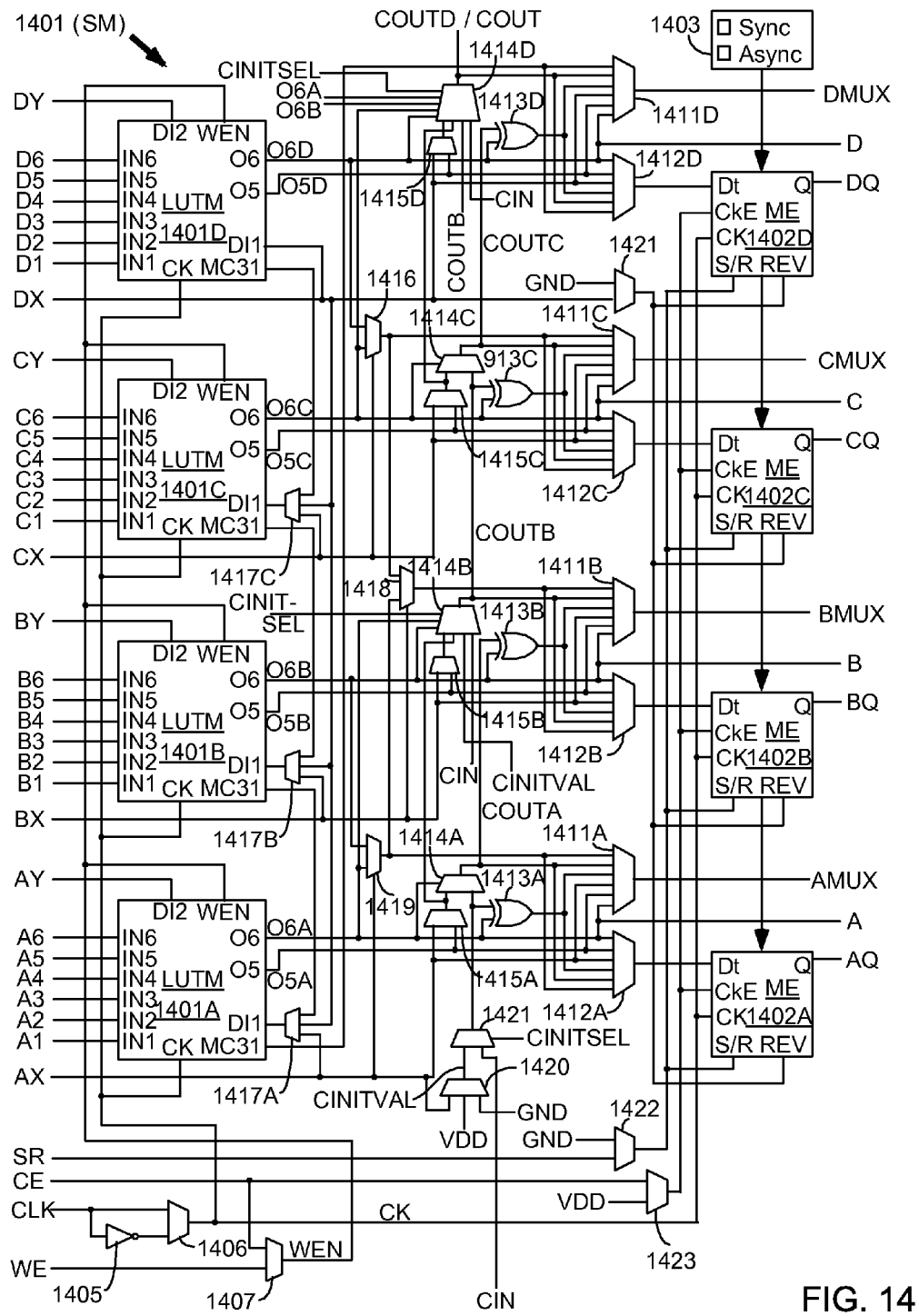
FIG. 14 is a block diagram of a configurable logic element of the device of FIG. 13.

Turning now to FIG. 14, a block diagram of a configurable logic element of the device of FIG. 13 is shown. In particular, FIG. 14 illustrates in simplified form a configurable logic element of a configuration logic block 1302 of FIG. 13. In the implementation of FIG. 14, slice M 1401 includes four lookup tables (LUTMs) 1401A-1401D, each driven by six LUT data input terminals A1-A6, B1-B6, C1-C6, and D1-D6 and each providing two LUT output signals O5 and O6. The O6 output terminals from LUTs 1401A-1401D drive slice output terminals A-D, respectively. The LUT data input signals are supplied by the FPGA interconnect structure via input multiplexers, which may be implemented by programmable interconnect element 1411, and the LUT output signals are also supplied to the interconnect structure. Slice M also includes: output select multiplexers 1411A-1411D driving output terminals AMUX-DMUX; multiplexers 1412A-1412D driving the data input terminals of memory elements 1402A-1402D; combinational multiplexers 1416, 1418, and 1419; bounce multiplexer circuits 1422-1423; a circuit represented by inverter 1405 and multiplexer 1406 (which together provide an optional inversion on the input clock path); and carry logic having multiplexers 1414A-1414D, 1415A-1415D, 1420-1421 and exclusive OR gates 1413A-1413D. All of these elements are coupled together as shown in FIG. 14. Where select inputs are not shown for the multiplexers illustrated in FIG. 14, the select inputs are controlled by configuration memory cells. That is, configuration bits of the configuration bitstream stored in configuration memory cells are coupled to the select inputs of the multiplexers to select the correct inputs to the multiplexers. These configuration memory cells, which are well known, are omitted from FIG. 14 for clarity, as well as from other selected figures herein.

In the pictured implementation, each memory element 1402A-1402D may be programmed to function as a synchronous or asynchronous flip-flop or latch. The selection between synchronous and asynchronous functionality is made for all four memory elements in a slice by programming Sync/Asynch selection circuit 1403. When a memory element is programmed so that the S/R (set/reset) input signal provides a set function, the REV input terminal provides the reset function. When the memory element is programmed so that the S/R input signal provides a reset function, the REV input terminal provides the set function. Memory elements 1402A-1402D are clocked by a clock signal CK, which may be provided by a global clock network or by the interconnect structure, for example. Such programmable memory elements are well known in the art of FPGA design. Each memory element 1402A-1402D provides a registered output signal AQ-DQ to the interconnect structure. Because each LUT 1401A-1401D provides two output signals, O5 and O6, the LUT may be configured to function as two 5-input LUTs with five shared input signals (IN1-IN5), or as one 6-input LUT having input signals IN1-IN6.

In the implementation of FIG. 14, each LUTM 1401A-1401D may function in any of several modes. When in lookup table mode, each LUT has six data input signals IN1-IN6 that are supplied by the FPGA interconnect structure via input multiplexers. One of 64 data values is programmably selected from configuration memory cells based on the values of signals IN1-IN6. When in RAM mode, each LUT functions as a single 64-bit RAM or two 32-bit RAMs with shared addressing. The RAM write data is supplied to the 64-bit RAM via input terminal DI1 (via multiplexers 1417A-1417C for LUTs 1401A-1401C), or to the two 32-bit RAMs via input terminals DI1 and DI2. RAM write operations in the LUT RAMs are controlled by clock signal CK from multiplexer 1406 and by write enable signal WEN from multiplexer 1407, which may selectively pass either the clock enable signal CE or the write enable signal WE. In shift register mode, each LUT functions as two 16-bit shift registers, or with the two 16-bit shift registers coupled in series to create a single 32-bit shift register. The shift-in signals are provided via one or both of input terminals DI1 and DI2. The 16-bit and 32-bit shift out signals may be provided through the LUT output terminals, and the 32-bit shift out signal may also be provided more directly via LUT output terminal MC31. The 32-bit shift out signal MC31 of LUT 1401A may also be provided to the general interconnect structure for shift register chaining, via output select multiplexer 1411D and CLE output terminal DMUX. Accordingly, the circuits and methods set forth above may be implemented in a device such as the devices of FIGS. 13 and 14, or any other suitable device.

Figure 15:
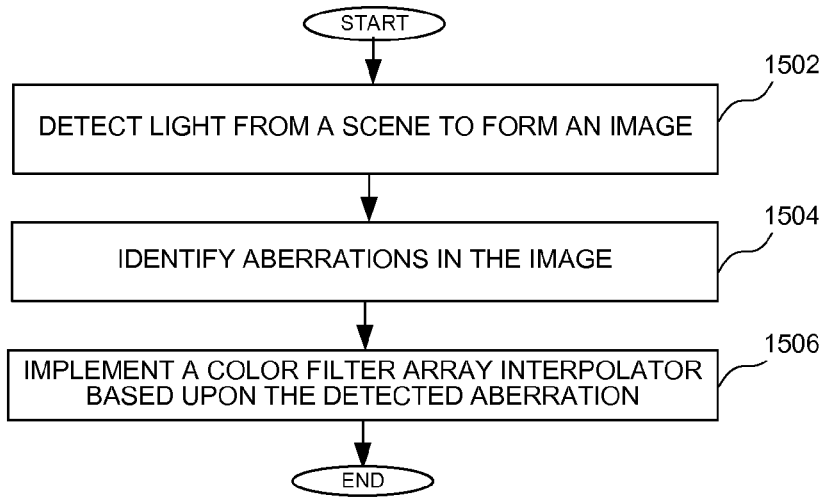
FIG. 15 is a flow chart showing a method of generating a digital image.

Turning now to FIG. 15, a flow chart shows a method of generating a digital image. In particular, light from a scene to form an image is detected at a block 1502. An aberration is then detected in the image at a block 1504. An aberration may be a chromatic artifact or a zipper effect, as described above. A color filter array interpolator is implemented at a step 1506 based upon the detected aberration in the image. For example, a first type of color filter array interpolator may be implemented if a chromatic artifact is detected, while a second type of color filter array interpolator may be implemented if a zipper effect is detected. The implementation of a color filter array may be changed on a picture-by-picture basis.

Figure 16:
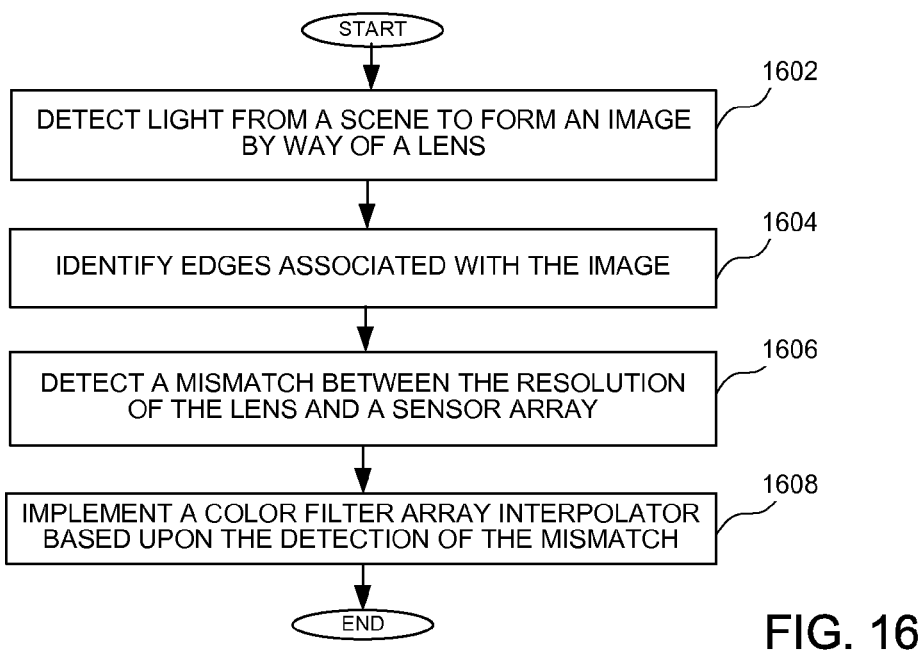
FIG. 16 is a flow chart showing another method of generating a digital image.

Turning now to FIG. 16, a flow chart shows another method of generating a digital image. A plurality of implementations of a color filter array interpolator is established for generating a digital image at a block 1602. Light from a scene to form an image is captured by way of a lens at a block 1604. A mismatch is detected between a resolution of the lens and a sensor array at a block 1606. An implementation of the plurality of implementations of a color filter array interpolator is then selected based upon the detection of the mismatch at a block 1608. A mismatch between the resolution of a lens and a sensor array may be detected in a variety of ways. For example, the mismatch may be known in advance based upon the selection of a lens for an image detecting device, and the implementation of the color filter array interpolator may be implemented based upon the selection of the lens. Alternatively, the mismatch may be detected by continuous monitoring of aberrations, where the selection of an implementation of the color filter array interpolator may be dynamically changed as set forth above in reference to FIG. 15.

The various elements of the methods of FIGS. 15-16 may be implemented using the circuits of FIGS. 1-13 as described, or using some other suitable circuits. While specific elements of the method are described, it should be understood that additional elements of the method, or additional details related to the elements, could be implemented according to the disclosure of FIGS. 1-13.

It can therefore be appreciated that new methods of and devices for generating a digital image has been described. It will be appreciated by those skilled in the art that numerous alternatives and equivalents will be seen to exist which incorporate the disclosed invention. As a result, the invention is not to be limited by the foregoing implementations, but only by the following claims.

What is claimed is:

1. A method of generating a digital image, the method comprising:
   detecting light from a scene to form an image;
   detecting an aberration in the image;
   selecting a set of chrominance groups, associated with an array of pixels of the image, for interpolating missing colors of the array of pixels based upon a type of aberration of the detected aberration; and
   implementing a color filter array interpolator based upon the selected set of chrominance groups.

2. The method of claim 1, wherein detecting an aberration in the image comprises detecting a mismatch between a resolution of the lens and a sensor by analyzing edge content.

3. The method of claim 1, wherein detecting an aberration in the image comprises detecting a change from a previous image.

4. The method of claim 1, further comprising selecting the color filter array interpolator on a picture-by-picture basis.

5. The method of claim 1, wherein implementing a color filter array interpolator based upon the detection of the mismatch selected set of chrominance groups comprises generating green values based upon a variable number of chrominance values.

6. The method of claim 1, wherein implementing a color filter array interpolator based upon the selected set of chrominance groups comprises generating red and blue values based upon a reduced number of neighboring pixels.

7. The method of claim 1, wherein implementing a color filter array interpolator based upon the selected set of chrominance groups comprises generating red and blue values using edge dependent interpolation.

8. A method of generating a digital image, the method comprising:
   detecting light from a scene to form an image by way of a lens;
   detecting a mismatch between a resolution of the lens and a sensor array;
   selecting a set of chrominance groups, associated with an array of pixels of the image, for interpolating missing colors of the array of pixels in response to detecting the mismatch between the resolution of the lens and the sensor array; and
   selecting an implementation of a plurality of implementations of a color filter array interpolator based upon the selected set of chrominance groups.

9. The method of claim 8, wherein detecting a mismatch between a resolution of the lens and a sensor comprises analyzing edge content.

10. The method of claim 8, wherein detecting a mismatch between a resolution of the lens and a sensor comprises detecting high frequency content.

11. The method of claim 8, wherein selecting an implementation of the plurality of implementations of the color filter array interpolator comprises selecting an implementation on a picture-by-picture basis.

12. The method of claim 8, wherein selecting an implementation of the plurality of implementations of a color filter array interpolator comprises generating green values based upon a reduced number of K values.

13. The method of claim 8, wherein selecting an implementation of the plurality of implementations of a color filter array interpolator comprises generating red and blue values based upon a reduced number of neighboring pixels.

14. The method of claim 8, wherein selecting an implementation of the plurality of implementations of a color filter array interpolator comprises generating red and blue values using edge dependent interpolation.

15. A device for generating a digital image, the device comprising:
   a lens for detecting light from a scene to form an image;
   a sensor array for generating pixels associated with the image; and a processing circuit detecting a mismatch between a resolution of the lens and the sensor array, and implementing a color filter array interpolator based upon the detection of the mismatch;

wherein the processing circuit selects a set of chrominance groups, associated with an array of pixels of the image, for interpolating missing colors of the array of pixels of the image in response to detecting the mismatch between the resolution of the lens and the sensor array.

16. The device of claim 15, wherein the processing circuit detects a mismatch between the resolution of the lens and the sensor array based upon the content of the image.

17. The device of claim 15, wherein the processing circuit selects an implementation of the color filter array interpolator on a picture-by-picture basis.

18. The device of claim 15, wherein the processing circuit implements the color filter array interpolator by generating green values based upon a variable number of chrominance values.

19. The device of claim 15, wherein the processing circuit implements the color filter array interpolator by generating red and blue values based upon a reduced number of neighboring pixels.

20. The device of claim 15, wherein the processing circuit implements the color filter array interpolator by generating red and blue values using edge dependent interpolation.

\* \* \* \* \*